United States Patent [19]

Yoshii

[11] 4,309,659
[45] Jan. 5, 1982

[54] METHOD FOR DETECTING A MAGNETIC SOURCE BY MEASURING THE MAGNETIC FIELD THEREABOUT

[76] Inventor: Tanekage Yoshii, No. 1-6-4, Ikego, Zushi-shi, Kanagawa-ken, Japan

[21] Appl. No.: 83,641

[22] Filed: Oct. 11, 1979

[30] Foreign Application Priority Data

Oct. 28, 1978 [JP] Japan .................. 53-133087

[51] Int. Cl.³ .................. G01V 3/40; G01V 3/165
[52] U.S. Cl. .................. 324/345; 324/326; 324/331
[58] Field of Search .............. 324/244, 260, 253, 254, 324/331, 326, 345, 301

[56] References Cited

U.S. PATENT DOCUMENTS

| | | | |
|---|---|---|---|
| 2,427,666 | 9/1947 | Felch et al. | 324/345 X |
| 2,635,134 | 4/1953 | Jenny | 324/331 |
| 2,694,793 | 11/1954 | Martin | 324/345 X |
| 2,850,689 | 9/1958 | Hansburg et al. | 324/345 X |
| 3,490,032 | 1/1970 | Zurflueh | 324/331 X |
| 3,530,375 | 9/1970 | Passier | 324/331 |
| 3,639,828 | 2/1972 | Salvi | 324/244 X |
| 3,644,825 | 2/1972 | Davis et al. | 324/345 X |
| 3,808,519 | 4/1974 | Lemercier et al. | 324/331 X |
| 4,095,169 | 6/1978 | Muse | 324/345 |

FOREIGN PATENT DOCUMENTS

1407686 6/1965 France .................. 324/331

*Primary Examiner*—Gerard R. Strecker
*Attorney, Agent, or Firm*—Eric P. Schellin

[57] ABSTRACT

A pair of magnetometer units symmetrically displaced from a reference measuring point along one axis and at least one magnetometer unit displaced from the reference point along a second axis perpendicular to the first axis respectively sense three and two directional field components of a magnetic source along two axes at each of the unit locations parallel to the first and second axes and a third axis perpendicular thereto at each of said pair of units. Total field strength and field gradients of the magnetic source are calculated from measurement sensor signals supplied by the magnetometer units to determine the position of the magnetic source relative to the reference point and its magnetic moments.

5 Claims, 9 Drawing Figures

METHOD FOR DETECTING A MAGNETIC SOURCE BY MEASURING THE MAGNETIC FIELD THEREABOUT

BACKGROUND OF THE INVENTION

This invention is concerned with a method for detecting a magnetic source by measuring the magnetic field issued therefrom.

The prior art does not provide practical means for measuring the accurate position of a magnetic source to the extent necessary for actual usage.

SUMMARY OF THE INVENTION

It is the object of the invention to provide a method for accurately detecting a magnetic source by the measurement of the magnetic field issued therefrom.

Let it be assumed that a magnetic body or an assembly or agglomeration of magnetic substances is a point dipole when it is observed from a point remote therefrom more than about 1.5 times of the total maximum length of the body or the assembly. Assuming that the origin of the coordinate axes are positioned at the center point of the magnetic body, the 3 axes (x,y,z) perpendicular to each other intersect at the origin and are directed toward north-south, east-west, up and down directions, respectively. If the magnetic potentials are $\phi x, \phi y, \phi z$ at a measuring point p(x,y,z) remote from the origin, and the magnetic moments of the magnetic body are Mx,My,Mz, the following equations can be derived by the magnetic potentials on the basis of the potential theory.

$$\phi_x = \frac{x}{r^3}, \phi_y = \frac{y}{r^3}, \phi_z = \frac{z}{r^3} \quad (1)$$

where, $$r = \sqrt{x^2 + y^2 + z^2} \quad (2)$$

Each of the components of the field gradients may be expressed by the following equations in terms of the fields of point P(x,y,z) Hx,Hy and Hz.

$$\left. \begin{array}{l} \frac{\delta Hx}{\delta x} = \frac{3x}{r^7}(3r^2 - 5x^2)Mx + \frac{3y}{r^7}(r^2 - 5x^2)My + \frac{3x}{r^7}(r^2 - 5x^2)Mz \\ \frac{\delta Hy}{\delta x} = \frac{3y}{r^7}(r^2 - 5x^2)Mx + \frac{3x}{r^7}(r^2 - 5y^2)My + \frac{-15xyz}{r^7}Mz \\ \frac{\delta Hz}{\delta x} = \frac{3z}{r^7}(r^2 - 5x^2)Mx + \frac{-15xyz}{r^7}My + \frac{3x}{r^7}(r^2 - 5z^2)Mz \end{array} \right\} \quad (3)$$

$$\left. \begin{array}{l} \frac{\delta Hx}{\delta y} = \frac{3y}{r^7}(r^2 - 5x^2)Mx + \frac{3x}{r^7}(r^2 - 5y^2)My + \frac{-15xyz}{r^7}Mz \\ \frac{\delta Hy}{\delta y} = \frac{3x}{r^7}(r^2 - 5y^2)Mx + \frac{3y}{r^7}(3y^2 - 5y^2)My + \frac{3z}{r^7}(r^2 - 5y^2)Mz \\ \frac{\delta Hz}{\delta y} = \frac{-15xyz}{r^7}Mx + \frac{3z}{r^7}(r^2 - 5y^2)My + \frac{3y}{r^7}(r^2 - 5z^2)Mz \end{array} \right\} \quad (4)$$

$$\left. \begin{array}{l} \frac{\delta Hx}{\delta z} = \frac{3z}{r^7}(r^2 - 5x^2)Mx + \frac{-15xyz}{r^7}My + \frac{3x}{r^7}(r^2 - 5z^2)Mz \\ \frac{\delta Hy}{\delta z} = \frac{-15xyz}{r^7}Mx + \frac{3z}{r^7}(r^2 - 5y^2)My + \frac{3y}{r^7}(r^2 - 5z^2)Mz \\ \frac{\delta Hz}{\delta z} = \frac{3x}{r^7}(r^2 - 5z^2)Mx + \frac{3y}{r^7}(r^2 - 5z^2)My + \frac{3z}{r^7}(3r^2 - 5z^2)Mz \end{array} \right\} \quad (5)$$

These field gradients are regulated by the following physical mathematical laws;

Laplacian equation:

$$\nabla^2 \phi = 0; \frac{\delta Hx}{\delta x} + \frac{\delta Hy}{\delta y} + \frac{\delta Hz}{\delta z} = 0 \quad (6)$$

Maxwell's equation:

$$\text{rot } H = 0; \frac{\delta Hz}{\delta y} - \frac{\delta Hy}{\delta z} = \quad (7)$$

$$0; \frac{\delta Hx}{\delta z} - \frac{\delta Hz}{\delta x} = 0; \frac{\delta Hy}{\delta x} - \frac{\delta Hx}{\delta y} = 0$$

Euler's equation:

$$x\frac{\delta H}{\delta x} + y\frac{\delta H}{\delta y} + z\frac{\delta H}{\delta z} = -nH;$$

where n is the coefficient representing the expansion of the magnetic source. In case the magnetic source is a point dipole, then n=3.

$$\left. \begin{array}{l} x\frac{\delta Hx}{\delta x} + y\frac{\delta Hx}{\delta y} + z\frac{\delta Hx}{\delta z} = -3Hx \\ x\frac{\delta Hy}{\delta x} + y\frac{\delta Hy}{\delta y} + z\frac{\delta Hy}{\delta z} = -3Hy \\ x\frac{\delta Hz}{\delta x} + y\frac{\delta Hz}{\delta y} + z\frac{\delta Hz}{\delta z} = -3Hz \end{array} \right\} \quad (8)$$

Total magnetic field is;

$$H_t = \sqrt{H_x^2 + H_y^2 + H_z^2} \quad (9)$$

According to the present invention, the total field and field gradients are expressed by nearly equal equations which are composed of the measuring data so as to achieve the object of this invention.

DETAILED DESCRIPTION OF THE PREFERRED EMBODIMENTS

Figure 1:
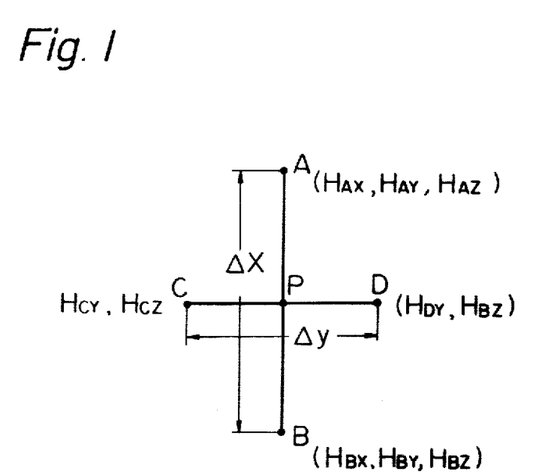
FIG. 1 shows a 4 point arrangement of the magnetometer sensor array by the method of this invention.

As shown in FIG. 1, the points, A, B; C, D are arranged symmetrically with respect to the measuring point P on the axes x,y, respectively, for location of two pair of magnetometer sensor units including one pair of units, each having three sensors detecting directional field strength components along three mutually perpendicular axes ($H_{Ax}$, $H_{Ay}$, $H_{Az}$; $H_{Bx}$, $H_{By}$, $H_{Bz}$) at the points A and B, respectively, and the second pair of units, each having two sensors detecting directional field strength components along two perpendicular axes ($H_{Cy}$, $H_{Cz}$; $H_{Dy}$, $H_{Dz}$) at points C and D, respectively. Let:

$$\overline{AB} = \Delta x, \quad \overline{CD} = \Delta y$$

Then, the field gradients and total field at the point P are determined by the following nearly equal equations.

$$\left.\begin{array}{l}\dfrac{\delta H_x}{\delta x} \approx \dfrac{H_{Ax} - H_{Bx}}{\Delta x} = a, \quad \dfrac{\delta H_x}{\delta y} = \dfrac{\delta H_y}{\delta x} \approx \dfrac{H_{Ay} - H_{By}}{\Delta x} = d \\[4pt] \dfrac{\delta H_y}{\delta y} \approx \dfrac{H_{Cy} - H_{Dy}}{\Delta y} = b, \quad \dfrac{\delta H_y}{\delta z} = \dfrac{\delta H_z}{\delta y} \approx \dfrac{H_{Cz} - H_{Dz}}{\Delta y} = e \\[4pt] \dfrac{\delta H_z}{\delta z} \approx C = -(a+b), \quad \dfrac{\delta H_z}{\delta x} = \dfrac{\delta H_x}{\delta z} \approx \dfrac{H_{Az} - H_{Bz}}{\Delta x} = f\end{array}\right\} \quad (10)$$

For measuring the magnetic field at 4 points A, B, C, D, the 3 components Hx, Hy, Hz are measured at points A, and B and measure the 2 components of Hy, Hz at points C and D.

Then, the total magnetic field is:

$$H_t = \tfrac{1}{2}\{(H_{Ax}^2 + H_{Ay}^2 + H_{Az}^2)^{\frac{1}{2}} + (H_{Bx}^2 + H_{By}^2 + H_{Bz}^2)^{\frac{1}{2}}\} = t \quad (11)$$

Therefore, the following 6 simultaneous equations are derived, in which 6 unknown factors (x,y,z,Mx,My,Mz) are included.

$$3t = \{(ax+dy+fz)^2 + (dx+dy+cz)^2 + (fx+ey+cz)^2\}^{\frac{1}{2}} \quad (12)$$

$$ar^7 = 3x(3r^2-5x^2)Mx + 3y(r^2-5x^2)My + 3z(r^2-5x^2)Mz \quad (13)$$

$$br^7 = 3x(r^2=5y^2)Mx + 3y(3r^2=5x^2)My + 3z(r^2-5y^2)Mz \quad (14)$$

$$dr^7 = 3y(r^2-5x^2)Mx + 3x(r^2-5y^2)My - 15\,xyz\,Mz \quad (15)$$

$$er^7 = -15xyzMx + 3z(r^2-5y^2)My - 15xyz\,Mz \quad (16)$$

$$fr^7 = 3z(r^2-5x^2)Mx - 15xyzMy + 3x(r^2-5z^2)Mz \quad (17)$$

By solving the foregoing simultaneous equations, each component of the magnetic moment and the coordinates of the point P(x,y,z) of the magnetic body may be determined.

Figure 2:
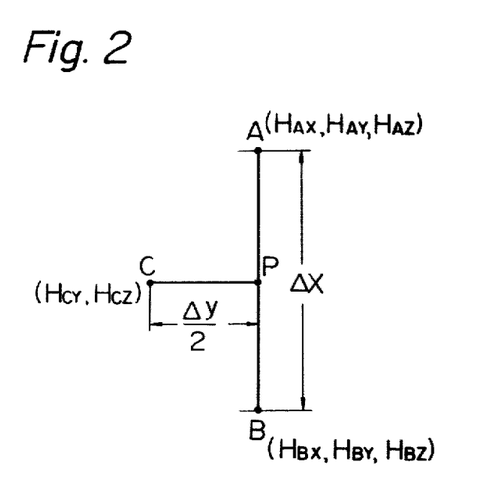
FIG. 2 shows a modified arrangement of FIG. 1.

To measure the magnetic field by only 3 points A,B and C, as shown in FIG. 2, the 3 components of the magnetic field Hx, Hy, Hz at points A and B, respectively, and the 2 components of the magnetic field Hy, Hz at point C are measured.

Then:

$$\left.\begin{array}{l}\dfrac{\delta H_y}{\delta y} \approx \left(\dfrac{H_{Cy} - H_{Ay}}{\Delta y} + \dfrac{H_{Cy} - H_{By}}{\Delta y}\right) = b' \\[6pt] \dfrac{\delta H_y}{\delta z} = \dfrac{\delta H_z}{\delta y} \approx \left(\dfrac{H_{Cz} - H_{Az}}{\Delta y} + \dfrac{H_{Cz} - H_{Bz}}{\Delta y}\right) = e'\end{array}\right\} \quad (18)$$

In case of a 3 point measurement, the solutions are obtained by replacing b' for b, and e' for e in the previous equation (10). In this case, the error increases slightly within a tolerable range. The calculation method by the measuring data:

Since these values a,b,c,d,e,f and t can be obtained by the magnetic field measurements, they are known values. Therefore, the previously described 6 unknown values (x,y,z,Mx,My,Mz) may be determined by solution of the equations (12)–(17).

The magnetic moments are calculated by solution of equations (15) (16) (17) as follows:

$$\left.\begin{array}{l}Mx = -\dfrac{r^3}{9yz}\{r^2(dz + fy + 4ex) - 5(ex^3 + fy^3 + dz^3)\} \\[6pt] My = -\dfrac{r^3}{9zx}\{r^2(ex + dz + 4fy) - 5(ex^3 + fy^3 + dz^3)\}\end{array}\right\} \quad (19)$$

$$Mz = -\dfrac{r^3}{9xy}\{r^2(ex + fy + 4dz) - 5(ex^3 + fy^3 + dz^3)\}$$

The total magnetic moment is obtained by the following equation.

$$M_t = \sqrt{Mx^2 + My^2 + Mz^2}$$

Let $$\frac{x}{z} = p, \quad \frac{y}{z} = q, \quad \frac{p}{q} = k \quad (21)$$

Then, from (13)–(14)

$$Z = \frac{(x^2 - y^2)(ex + fy) - 2ex^3 + 2fy^3}{(a - b)xy - d(x^2 - y^2)} \quad (22)$$

Applying (21) to (22), $$q = \frac{d(k^2 - 1) - (a - b)k}{(ek - f)(k^2 + 1)} \quad (23)$$

From (12), $$Z = 3t\{((ak+d)q+f)^2 + ((dk+b)q+e)^2 + ((f-k+e)q+c)^2\}^{-\frac{1}{2}} \quad (24)$$

From (13)–(14), $$(ek-f)(k^2-l)q^3 - d(k^2+l) - 3(a+b)k$$
$$q^2 + 2(ek+f)q - 2d = 0 \quad (25)$$

Applying (23) to (25), $$k^6 + \frac{2d\{-(a-b)(a+2b) - (d^2+e^2+f^2)\}}{d^2(a+2b) - e^2(a-b) + 2def} k^5$$
$$+ \frac{(a-b)^2(a+2b) + d^2(4a-7b) + (-2e^2+f^2)(a-b) + 6def}{d^2(a+2b) - e^2(a-b) + 2def} k^4$$
$$+ \frac{-4d\{(a-b)^2 + (d^2+e^2+f^2)\}}{d^2(a+2b) - e^2(a-b) + 2def} k^3$$
$$+ \frac{(a-b)^2(2a+b) + d^2(-7a+4b) - e^2(a-b) + 2f^2(a-b) + 6def}{d^2(a+2b) - e^2(a-b) + 2def} k^2$$
$$+ \frac{2d\{(a-b)(2a+b) - (d^2+e^2+f^2)\}}{d^2(a-2b) - e^2(a-b) + 2def} k$$
$$+ \frac{d^2(2a+b) + f^2(a-b) + 2def}{d^2(a+2b) - e^2(a-b) + 2def} = 0$$

Thus, a solution to this 6 degree equation relating to k is obtained by applying the following calculation method.
From (26), $$f(k) = k^6 + A_1 k^5 + A_2 k^4 + A_3 k^3 + A_4 k^2 + A_5 k + A_6 = 0 \quad (27)$$

$$f(k) = (k^2 + Pk + Q)(k^4 + B_1 k^3 + B_2 k^2 + B_3 k + B_4) + R\cdot k + S = 0 \quad (28)$$

$$k^6 + (B_1 + P)k^5 + (B_2 + PB_1 + Q)k^4 +$$
$$(B_3 + PB_2 + QB_1)k^3 + (B_4 + PB_3 + QB_2)k^2 +$$
$$(R + BP_4 + QB_3)k + S + QB_4 = 0 \quad (29)$$

If the values of the P and Q are obtained by setting R=0, S=0 in equation (29), then the following equation provides the solution.

$$k^2 + Pk + Q = 0$$

Generalizing the equation (29), the following formulae are obtained:
$$R = B_{n-1} = 0 \quad (30)$$

$$S = B_n + PB_{n-1} = 0 \quad (31)$$

Since $B_n$ is the function of P and Q, partially differentiate (30) and (31) by P and Q;

$$\frac{\partial B_{n-1}}{\partial P} \Delta P + \frac{\partial B_{n-1}}{\partial Q} \Delta Q + B_{n-1} = 0 \quad (32)$$

$$\left(\frac{\partial B_n}{\partial P} + P\frac{\partial B_{n-1}}{\partial P} + B_{n-1}\right)\Delta P +$$
$$\left(\frac{\partial B_n}{\partial Q} + P\frac{\partial B_{n-1}}{\partial Q}\right)\Delta Q + B_n + PB_{n-1} = 0 \quad (33)$$

The partial derivative of $B_n$ is calculated as follows: Generalizing and comparing (27) with (29);

$$B_n = A_n - PB_{n-1} - QB_{n-2} \quad (34)$$

where, n=1,2,3,4,5,6.

$B_0 = 1, B_{-1} = 0$
By partially differentiating (34) by P and Q;

$$C_n = B_n - PC_{n-1} - QC_{n-2} \quad (35)$$

where, n=1,2,3,4,5.

$$C_0 = 1, C_{-1} = 0 \quad (36)$$

$$\frac{\partial B_n}{\partial P} = -C_{n-1}, \frac{\partial B_n}{\partial Q} = -C_{n-2}$$

where, n=1,2,3,4,5,6.
From (32), (33);
$$C_{n-2}\Delta P + C_{n-3}\Delta Q = B_{n-1} \quad (37)$$

$$(C_{n-1} - B_{n-1})\Delta P + C_{n-2}\Delta Q = B_n \quad (38)$$

From these equations, $\Delta P$ and $\Delta Q$ is obtained, by letting n=6, $$\Delta P = -\frac{B_5 C_4 - B_6 C_3}{C_4 C_4 - C_3(C_5 - B_5)} \quad (39)$$

$$\Delta Q = \frac{B_6 C_4 - B_5(C_5 - B_5)}{C_4 C_4 - C_3(C_5 - B_5)} \quad (40)$$

Thus, $B_5$, $B_6$, $C_3$, $C_4$, $C_5$ is obtained by the following procedure.

$$\begin{bmatrix} A_1 \\ A_2 \\ A_3 \\ A_4 \\ A_5 \\ A_6 \end{bmatrix} \rightarrow \begin{bmatrix} B_1 = A_1 - P \\ B_2 = A_2 - PB_1 - Q \\ B_3 = A_3 - PB_2 - QB_1 \\ B_4 = A_4 - PB_3 - QB_2 \\ B_5 = A_5 - PB_4 - QB_3 \\ B_6 = A_6 - PB_5 - QB_4 \end{bmatrix} \rightarrow \begin{bmatrix} C_1 = B_1 - P \\ C_2 = B_2 - PC_1 - Q \\ C_3 = B_3 - PC_2 - QC_1 \\ C_4 = B_4 - PC_3 - QC_2 \\ C_5 = B_5 - PC_4 - QC_3 \end{bmatrix}$$

$A_n$ can be calculated from (26), $B_n$ from $A_n$ and $C_n$ from $B_n$.
First, by assigning certain values to P and Q, respectively, $\Delta P$ and $\Delta Q$ are calculating by using (39) and (40). The values of P and Q are then replaced by $(P+\Delta P) \rightarrow P, (Q+\Delta Q) \rightarrow Q$ and the procedure repeated until $\Delta P < 0.001$, $\Delta Q < 0.01$, corresponding to $R \rightarrow 0$ and $S \rightarrow 0$. These values of P and Q result in the following solution.

$$k^2 + Pk + Q = 0 \quad (41)$$

The solution should be real numbers which are represented as follows:

$$k_1 = \frac{1}{2}\left(-P - \sqrt{P^2 - 4Q}\right) \quad (42)$$

-continued $$k_2 = \tfrac{1}{2}\left(-P + \sqrt{P^2 - 4Q}\right)$$

All values of k except for the above solutions (42) are eliminated because they are imaginary solutions mathematically.

From (23);

$$q_1 = \frac{d(k_1^2 - 1) - (a - b)k_1}{(ek_1 - f)(k_1^2 + 1)}, \; q_2 = \frac{d(k_2^2 - 1) - (a - b)k_2}{(ek_2 - f)(k_2^2 + 1)} \quad (43)$$

The coordinates of the measuring point are obtained from these values as shown in following equations.

$$\left.\begin{array}{l}z_1 = 3f\{((ak_1 + d)q_1 + f)^2 + ((dk_1 + b)q_1 + e)^2 + \\ \qquad\qquad \{(fk_1 + e)q_1 + c\}^2\}^{-\tfrac{1}{2}} \\ x_1 = p_1 z_1 = k_1 q_1 z_1 \\ y_1 = q_1 z_1 \end{array}\right\} \quad (44)$$

$$r_1 = \sqrt{x_1^2 + y_1^2 + z_1^2} \quad (45)$$

$$\left.\begin{array}{l}z_2 = 3f\{((ak_2 + d)q_2 + f)^2 + ((dk_2 + b)q_2 + e)^2 + \\ \qquad\qquad \{(fk_2 + e)q_2 + c\}^2\}^{-\tfrac{1}{2}} \\ x_2 = p_2 z_2 = k_2 q_2 z_2 \\ y_2 = q_2 z_2 \end{array}\right\} \quad (46)$$

$$r_2 = \sqrt{x_2^2 + y_2^2 + z_2^2} \quad (47)$$

The values of magnetic moments of the magnetic source are obtained by following equations. From (19);

$$\left.\begin{array}{l}Mx_1 = -\dfrac{r_1^3}{9y_1z_1}\{r_1^2(dz_1 + fy_1 + 4ex_1) - 5(ex_1^3 + fy_1^3 + dz_1^3)\} \\ My_1 = -\dfrac{r_1^3}{9z_1x_1}\{r_1^2(ex_1 + dz_1 + 4fy_1) - 5(ex_1^3 + fy_1^3 + dz_1^3)\} \\ Mz_1 = -\dfrac{r_1^3}{9x_1y_1}\{r_1^2(ex_1 + fy_1 + 4dz_1) - 5(ex_1^3 + fy_1^3 + dz_1^3)\}\end{array}\right\} \quad (48)$$

From (20);

$$Mt_1 = \sqrt{Mx_1^2 + My_1^2 + Mz_1^2} \quad (49)$$

From (19);

$$Mx_2 = -\dfrac{r_2^3}{9y_2z_2}\{r_2^2(dz_2 + fy_2 + 4ex_2) - 5(ex_2^3 + fy_2^3 + dz_2^3)\} \quad (50)$$

$$My_2 = -\dfrac{r_2^3}{9z_2x_2}\{r_2^2(ex_2 + dz_2 + 4fy_2) - 5(ex_2^3 + fy_2^4 + dz_2^3)\}$$

$$Mz_2 = -\dfrac{r_2^3}{9z_2y_2}\{r_2^2(ex_2 + fy_2 + 4dz_2) - 5(ex_2^3 + fy_2^3 + dz_2^4)\}$$

From (20);

$$Mt_2 = \sqrt{Mx_2^2 + My_2^2 + Mz_2^2} \quad (51)$$

The real solutions of the 6 degree equation, are selected and the imaginal solutions are omitted. The value of z is then determined naturally plus or minus on a continuous curve by observing, whether the measuring point is located above or below from the magnetic body so that the solution is finally reduced to only one.

ONE CONCRETE EXAMPLE (1) Installation on Aircraft.

Figure 3:
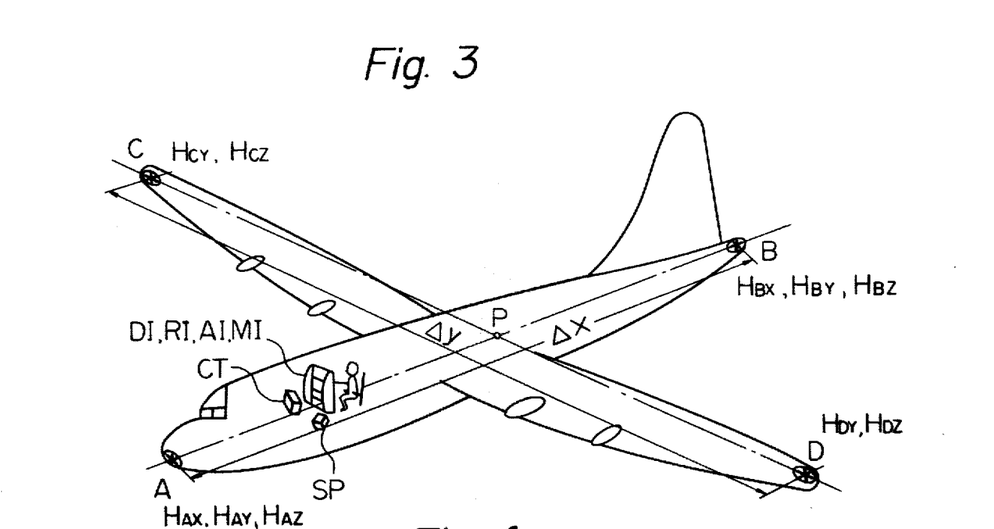
FIG. 3 shows one example in perspective view of an installation of magnetometer sensors and other related devices, in accordance with the invention.
Figure 4:
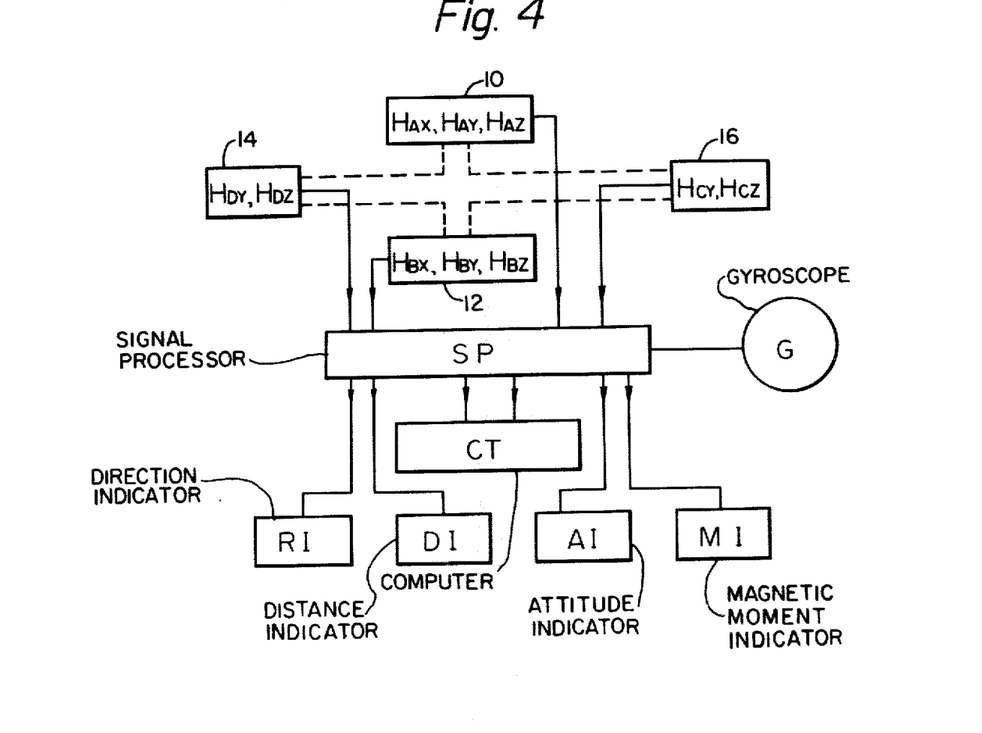
FIG. 4 is a block diagram showing the detection system used for carrying out the method of this invention.

An example of the magnetic detection system installed in aircraft to locate a submarine in the water, is shown in FIGS. 3 and 4.

A pair of 3 axes sensors ($H_{Ax}$, $H_{Ay}$, $H_{Az}$; $H_{Bx}$, $H_{by}$, $H_{Bz}$) are positioned at the tip A and the tail B of the aircraft body, and a pair of 2 axes sensors ($c_y$, $H_{Cz}$; $H_{Dy}$, $H_{Dz}$) are positioned at the end of wing C and D. The 3 axes sensors and the 2 axes sensors form magnetometer units 10, 12, 14 and 16 through which directional components of a target magnetic field at the locations of the units are simultaneously measured along three or two orthogonal directions designated as X, Y and Z axes. Such magnetometer units are per se well known in the art hereinafter referred to and are operative to produce output signals designated herein as $H_{Ax}$, $H_{Ay}$, $H_{Az}$, for example, at point A as indicated with respect to unit 10 in FIG. 4. The center line of the aircraft body is located on x axis and both wings are aligned with axis.

Assuming that the aircraft is flying on a north or south heading and in the level flight, the output of each sensor is fed to the signal processing device SP, wherein x and y components of signal are multiplied by the sine or cosine of the direction coefficient, so as to compensate for each component of the magnetic field with respect to north-south and east-west when the direction of the aircraft varies.

In FIG. 3, the longitudinal center line of the aircraft body is the x-axis of each unit 10 and 12 while the y-axis of units 14 and 16 extending between wing tips intersects the x-axis on a vertical line when the aircraft flies at the level flight whereby each sensor is arranged to avoid the effect of adjacent magnetic substances, thereby avoiding the magnetic noise. The signal is fed to the signal processing device SP and is calculated by computer CT and the result is sent to each of direction indicator RI, distance indicator DI, attitude indicator AI and magnetic moment indicator MI.

The sensor signals form analog inputs to the signal processor SP that are digitized by well known analog to digital conversion circuits. Calculations in accordance with procedures hereinbefore described are performed by the computer CT interfaced with the signal processor through appropriate data terminals. Calculated data terminals interface the processor SP with the indicators. The details of the computer and processor form no part of the present invention. Only the general functions as herein described are necessary for an understanding of the invention.

The input signal detected in sensors at points A, B, C, D are connected differentially to each corresponding sensor A, B, and C, D mutually, in a manner well known in the art and the signal derivatives so obtained which are then magnified. The resultant signal components thereby detected at point A for example, along the x-axis is represented by the following expression:

$$\Delta H_x = (H_{Ax} + H_x) - (H_{Bx} + H_x) = H_{Ax} - H_{Bx}$$

where $H_x$ is one component of the earth's magnetic field. Thus, the effect of the earth's magnetic field is canceled as hereinafter explained.

In the above arrangement, the craft body noise and the other noise are eliminated by other appropriate means, so that only the pure measuring signal is detected and digitized without distortion applied to the computer CT. This signal is converted into a signal of the required form by the signal processing device SP and then the direction, distance, attitude and moment of the magnetic source are indicated and recorded continuously, automatically and momentarily. The computer CT preferably has a large memory capacity, in order to shorten the computing time.

FIG. 4 shows the block diagram of this detection system.

In this system, the magnetometer sensor is required to have directionality and sensitivity as well as high accuracy as high as possible. The fluxgate type magnetometer (sensitivity: 0.1 $\gamma$/div.) which comprises high permeability material and the SQUID type magnetometer (sensitivity: 0.00001 $\gamma$/div.) which comprises super conductor material are recommended at present as current commercial units for this invention.

Figure 5:
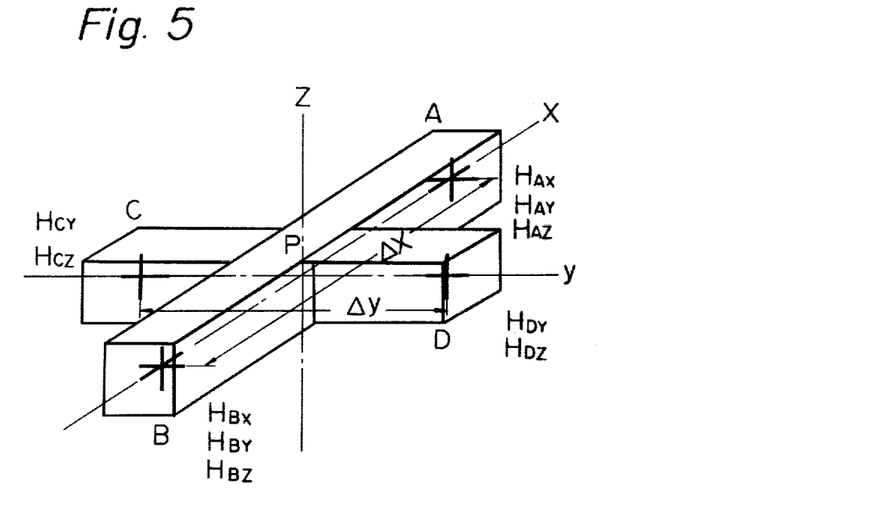
FIG. 5 is a perspective view showing a 4 point arrangement of the magnetometer sensors according to this invention.

The structure for 4 point measurement is shown in FIG. 5. The points A, B and C, D on the x and y axes are arranged symmetrically with respect to the measuring point P, and the 3-axes sensor units fixedly positioned at points A, B so as to be able to measure 3 orthogonal magnetic field $H_{Ax}$, $H_{Ay}$, $H_{Az}$; $H_{Bx}$, $H_{By}$, $H_{Bz}$ on x-axis while 2 axes sensor units are fixedly positioned at the points C, D, so as to measure orthogonal magnetic field $H_{Cy}$, $H_{Cz}$; $H_{Dy}$, $H_{Dz}$ on y-axis. I show the structure of 3 points measurement in FIG. 6. The points A, B on the x-axis are symmetrically arranged with respect to the measuring point P, and point C positioned on the y-axis. In this embodiment, the point D associated with a 4 point measurement is dispensed with.

Figure 6:
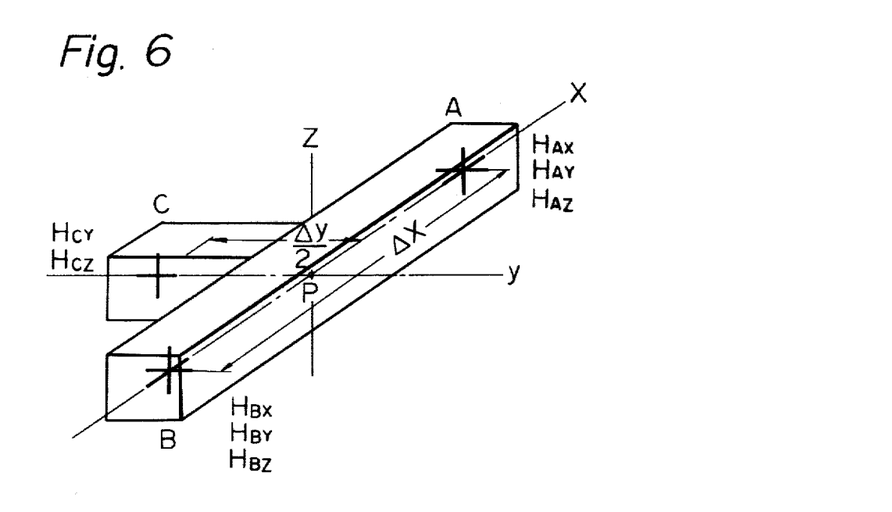
FIG. 6 shows a variation of FIG. 5. in the form of a 3 point arrangement of the magnetometer sensors.

The measuring points are on the x-y plane and each point moves integrally as a unit and does not move independently and individually.

When the directional magnetometer sensor rotates in the uniform earth magnetic field, it will sense the earth magnetic field and generate a much larger signal than any other detecting signal. When the total sensor group rotates as a unit, the earth magnetic field is compensated for by the differential connection of corresponding symmetrical sensors so that only the required detecting signal is obtained. Since it is assumed that the earth magnetic field is uniform in a narrow area, even if the sensor axis rotates, the orthogonal 3 directional resultant magnetic field will not change, and is held constant.

It is necessary to design the sensor distance $\Delta x$ and $\Delta y$ to be of the most optimum value in accordance with the detection purpose, magnetometer sensitivity, the size of target magnetic body, magnetic moment and its detecting distance. The detecting distance will be naturally determined by the relation between the largeness of the target magnetic body and its magnetic moment and the magnetometer sensor sensitivity. The detection distance will be larger, if the sensitivity is more higher. If the distance $\Delta x$, $\Delta y$ is very small, the difference in the magnetic field becomes smaller, so that ultimately the field gradients cannot be determined. If the distance $\Delta x$, $\Delta y$ is very large, the error becomes large, so the position of the magnetic-body cannot be precisely determined. There is therefore an optimum distance of $\Delta x$, $\Delta y$ from the target body. Since deviations in the perpendicularity between sensor lines AB and CD, and the rectangularity in each sensor at each point cause the error, the accurate orthogonarity of each of the sensors is required to be as high grade as possible.

(2) Experiment on a magnetic model of a ship:

The following is an example in which a magnetic model of a ship is used for the measurement using the above system:

The heading of the magnetic model of the ship (total length: 180 cm, max. width: 25.3 cm, weight: 24.2 kg), constructed of steel material is north-south and east-west directions, and the model is shifted horizontally on the line in north-south direction. At that time, the downwardly directed vertical distance is changed from model center to the 3 axial magnetometer sensor of fluxgate type and definitely fix the same in order to measure the 3 axial magnetic field components directed downwardly in each plane perpendicular parallel to each axis under the model and the equi-magnetic field curve is recorded. The total field and field gradients of the points on the N-S line in the positions of the sensor just vertically under the model, spaced a certain distance from model line in eastern and western direction, are computed and data so obtained is introduced into the theoretical equations and the measuring point and the center of magnetic model of the ship are carried out by means of computer. At that time, the distance between sensors was determined by simulating the actual airplane installation as follows:

$$x = 72 \text{ cm}, y = 75 \text{ cm}.$$

The results of this experiment were as follows:

A comparison was made between the true value of the distance between the measuring point and the center point of the magnetic model of the ship computed by the coordinate x,y,z and the value of distance computed by the magnetic field measurement based on this method.

Figure 7:
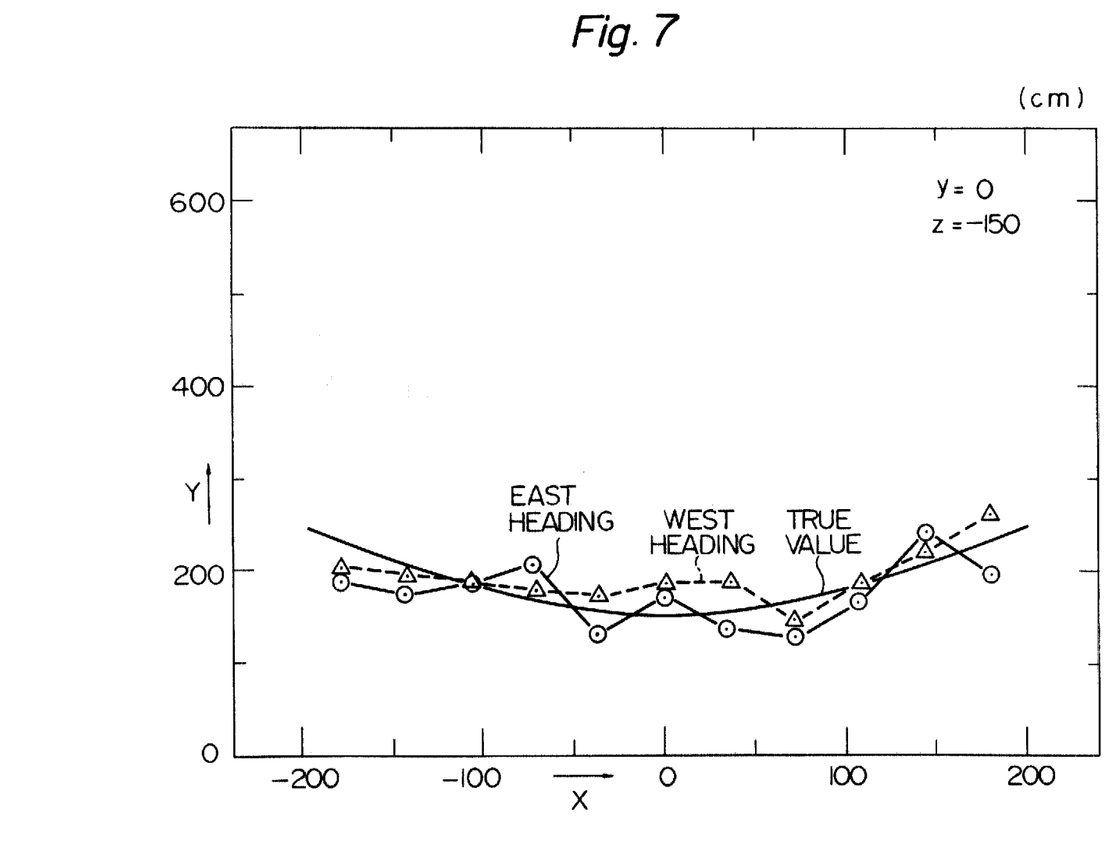
FIG. 7, FIG. 8 and FIG. 9 show comparison curves of the detection distance between the true value and the computed value which were obtained by the method of this invention.
Figure 8:
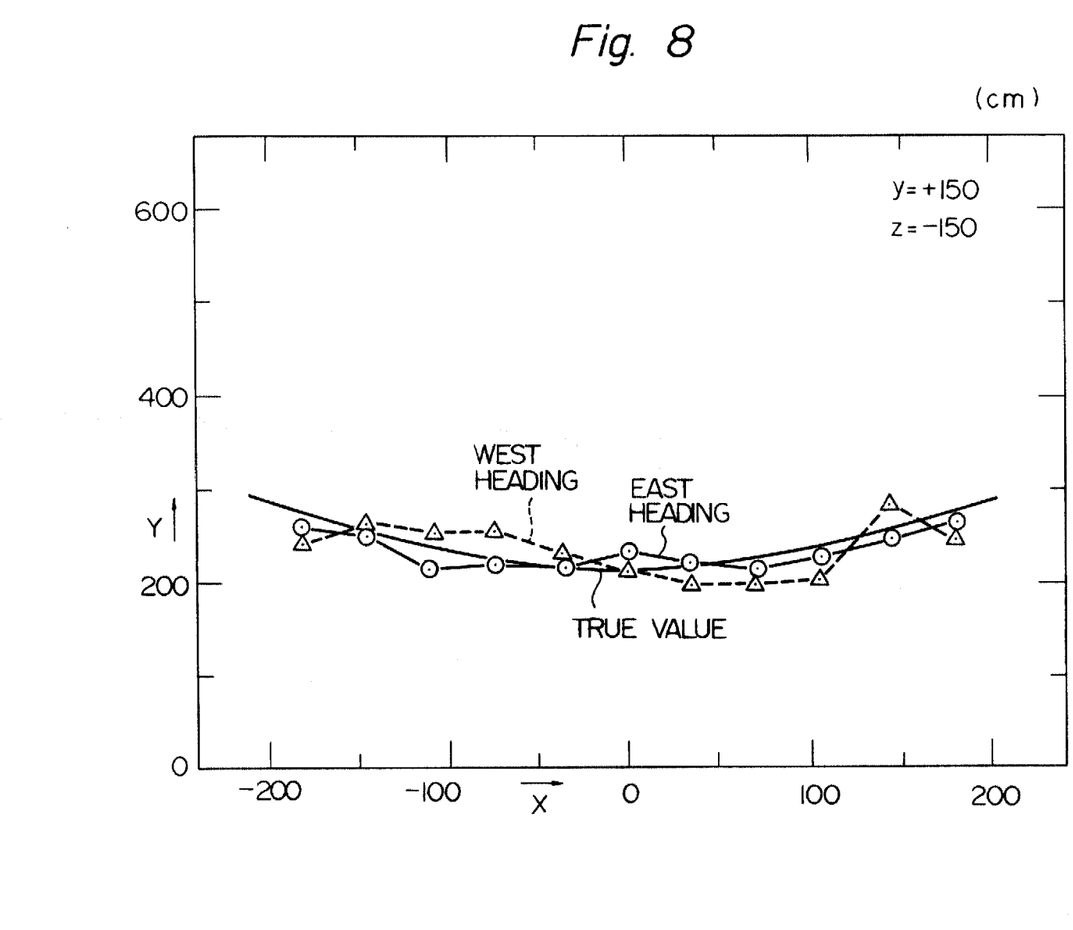
Figure 9:
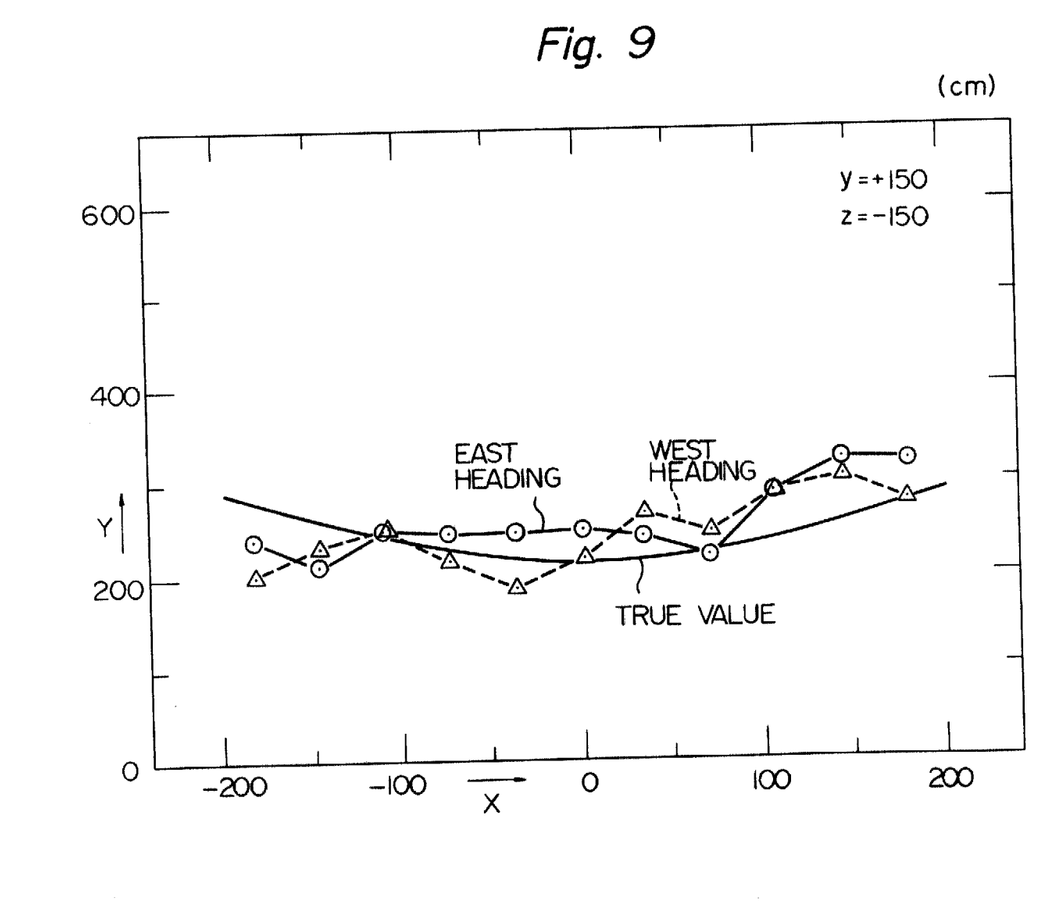

FIGS. 7, 8 and 9 show the comparison of the true distance with the distance computed by this method about each point on the north-south line through 3 points; i.e., the points at vertical distance 150 cm from the center of the model, and at distance 150 cm shifted in eastern direction and at distance 150 cm shifted in western direction by directing the model to east and west heading. These values coincide substantially with each other, as shown in these figures.

Various causes of the distance error, apparently occur, such as: Error caused by the experiment, error by putting nearly equal measured magnetic field instead of theoretical equation, error by replacing a certain actual magnetic source by point magnetic dipole, etc. However, the errors based on these causes will be almost negligible when the distance of the measuring point from the object is more than 1.5 times the total length of the magnetic source. The error caused by the experiment is substantial.

Therefore, the method of this invention is for high accurate detection of the position of magnetic source, provided that the satisfactory total field and field gradients can be measured as explained herein by the detection theory.

(3) Applicable field of this invention

The target substances which can be detected by the method of this invention and the features of this method of invention are as follows:

(1) Target substances to be detected.

(a) All substances which are constructed with steel materials:

Ship's body, Tank, Armored vehicle, Motor car, Steel cases, Mine cases, Non-explosive Bomb, Rifle and Gun, pistol, swords, cans and a small magnetic body assembly, etc.

(b) All embedded mineral ore having magnetism: Underground mineral ore, underwater oil field, embedded magnetic materials in Satelite, etc.

(2) Features of this invention.

(a) The target substances can be necessarily detected, if they have magnetic materials, even if it is impossible to detect them by the naked eyes, light, electro-magnetic wave, ultra sonic wave, infrared rays and other physical phenomena.

(b) Even if the target substance and measuring point are at rest or are moving, the relative position between target and measuring point can be detected continuously time to time.

(c) The position of the target magnetic body can be detected, recorded and displayed without time lag as a point by means of the magnetic field.

(4) Fields to which this invention is applicable.

(A) General commercial industry (a) The detection of embedded mineral ore and magnetic substances under the bottom of sea and underground.

(b) The detection of unexplosive bombs and mines and other steel structures embedded in the bottom sand or mud, during the dredging operation at the entrance of port and bay or the narrow water path.

(c) The detection of embedded pistols and swords, etc. in the river or pool, in case of criminal search.

(d) The archaeological detection of the swords and iron made vessels which are excavated in the acient ruins in Persia, Egypt, Peru, etc.

(e) The detection of the position of sunken ships in salvage.

(f) The detection of position of embedded magnetic materials by satellites passing near the planets (B) Defense industry.

(a) This is the most effective technique to detect a submerged submarine, from an anti-submarine aircraft.

(b) This is a necessary technique to search and detect the location of mines laying at the bottom of the sea and embedded mines under sand, mud and algae in the sea.

(c) The automatic detection of the position of Tanks, Armored vehicles and Motor cars, etc.

(d) The detection of the position of an approaching ship, when laying mines in the deep sea.

I claim:

1. A method of detecting the position of a magnetic source relative to a measuring point (P) and associated magnetic moments by measuring total source generated field strength and field strength gradients at said measuring point, including the steps of: establishing two measuring locations (A and B) symmetrically displaced from the measuring point along a first axis (X); establishing at least a third measuring location (C) displaced from the measuring point along a second axis (Y) perpendicular to and intersecting the first axis at the measuring point; mesuring three directional components of the field strength ($H_{Ax}$, $H_{Ay}$, $H_{Az}$; $H_{Bx}$, $H_{By}$, $H_{Bz}$) at each of said two measuring locations defined by the intersection of the first axis and two other mutually perpendicular intersecting axes respectively parallel to the second axis and a third axis (Z); and measuring two directional components of the field strength ($H_{Cy}$, $C_{Cz}$) at said third measuring location along the second axis and a perpendicular intersecting axis parallel to the third axis.

2. The method of claim 1 including the step of: establishing a fourth measuring location (D) displaced from the measuring point along said second axis in symmetrical relation to the third measuring location; and measuring two directional components of the field strength ($H_{Dy}$, $H_{Dz}$) at said fourth measuring location along the second axis and a perpendicular intersecting axis parallel to the third axis.

3. The method of claim 2 wherein said measurements of the directional components of the field strength are respectively effected by generation of corresponding signals at each of the measuring locations, the signals generated at the measuring locations symmetrically displaced from the measuring point being subtracted from each other to cancel the influence of the earth's magnetic field on the measurements.

4. The method of claim 2 including the step of: correcting said measurements of field strength components for magnetic azimuth angle deviations.

5. The method of claim 2 wherein said mesurements of the directional components of the field strength are respectively effected by generation of corresponding signals at each of the measuring locations, the signals generated at the measuring locations symmetrically displaced from the measuring point being subtracted from each other to cancel the influence of the earth's magnetic field on the measurements.

* * * * *